(12) United States Patent
Wang et al.

(10) Patent No.: US 7,330,578 B2
(45) Date of Patent: Feb. 12, 2008

(54) DRR GENERATION AND ENHANCEMENT USING A DEDICATED GRAPHICS DEVICE

(75) Inventors: Bai Wang, Palo Alto, CA (US); Dongshan Fu, Santa Clara, CA (US)

(73) Assignee: Accuray Inc., Sunnyvale, CA (US)

( * ) Notice: Subject to any disclaimer, the term of this patent is extended or adjusted under 35 U.S.C. 154(b) by 270 days.

(21) Appl. No.: 11/166,686

(22) Filed: Jun. 23, 2005

(65) Prior Publication Data

US 2006/0291710 A1 Dec. 28, 2006

(51) Int. Cl.
*G06K 9/00* (2006.01)
*G06T 15/00* (2006.01)

(52) U.S. Cl. ........................ 382/131; 345/419
(58) Field of Classification Search .................... None
See application file for complete search history.

(56) References Cited

U.S. PATENT DOCUMENTS

| | | | |
|---|---|---|---|
| 4,438,495 A | 3/1984 | Collins et al. | |
| 4,641,352 A | 2/1987 | Fenster et al. | |
| 5,117,829 A | 6/1992 | Miller et al. | |
| 5,611,000 A | 3/1997 | Szeliski et al. | |
| 5,696,848 A | 12/1997 | Patti et al. | |
| 5,825,908 A | 10/1998 | Pieper et al. | |
| 5,901,199 A | 5/1999 | Murphy et al. | |
| 5,987,164 A | 11/1999 | Szeliski et al. | |
| 6,081,577 A | 6/2000 | Webber | |
| 6,262,740 B1 | 7/2001 | Lauer et al. | |
| 6,295,377 B1 | 9/2001 | Dufaux et al. | |
| 6,307,914 B1 | 10/2001 | Kunieda et al. | |
| 6,415,013 B1 | 7/2002 | Hsieh et al. | |
| 6,516,046 B1 | 2/2003 | Frohlich et al. | |
| 6,549,576 B1 | 4/2003 | Moriyoshi | |
| 6,549,645 B1 | 4/2003 | Oikawa et al. | |
| 6,658,059 B1 | 12/2003 | Iu et al. | |
| 6,662,036 B2 | 12/2003 | Cosman | |

(Continued)

OTHER PUBLICATIONS

Daniel B. Russakoff, et al., "Fast Calculation of Digitally Reconstructed Radiographs Using Light Fields", 12pp (684-695), Medical Imaging 2003: Image Processing, Milan Sonka, J. Michael Fitzpatrick, Editors, Proceedings of SPIE vol. 5032 (2003) © 2003 SPIE.

(Continued)

*Primary Examiner*—Bhavesh M Mehta
*Assistant Examiner*—Charles Kim
(74) *Attorney, Agent, or Firm*—Blakely, Sokoloff, Taylor & Zafman LLP

(57) ABSTRACT

DRR generation and enhancement using a dedicated graphics device are described herein. In one embodiment, an example of a process for generating DRR (digitally reconstructed radiography) images includes, but is not limited to, loading a volume rendering program into a graphics device, the volume rendering program representing a predetermined algorithm according to a non-linear attenuation model. In response to 3D scan data, the graphics device is invoked to execute the volume rendering program to perform at least a portion of volume rendering operations on at least a portion of the 3D scan data, which may include modifying the 3D scan data according to the predetermined algorithm to compensate for a difference between a first attenuation of an object with respect to a second attenuation associating a known intensity of the object. Other methods and apparatuses are also described.

4 Claims, 15 Drawing Sheets

U.S. PATENT DOCUMENTS

| | | |
|---|---|---|
| 6,728,424 B1 | 4/2004 | Zhu et al. |
| 6,792,158 B1 | 9/2004 | Brumley |
| 6,792,162 B1 | 9/2004 | Edgar |
| 6,837,892 B2 | 1/2005 | Shoham |
| 6,907,281 B2 | 6/2005 | Grzeszczuk |
| 7,072,435 B2 | 7/2006 | Metz et al. |
| 2002/0077543 A1 | 6/2002 | Grzeszczuk et al. |
| 2003/0011624 A1 | 1/2003 | Ellis |
| 2003/0065260 A1 | 4/2003 | Cheng et al. |
| 2003/0073901 A1 | 4/2003 | Simon et al. |
| 2003/0176780 A1* | 9/2003 | Arnold et al. ............. 600/407 |
| 2004/0042656 A1 | 3/2004 | Timor et al. |
| 2004/0052409 A1 | 3/2004 | Bansal et al. |
| 2004/0092815 A1 | 5/2004 | Schweikard et al. |
| 2004/0228453 A1 | 11/2004 | Dobbs et al. |
| 2004/0234113 A1 | 11/2004 | Miga |
| 2004/0240733 A1 | 12/2004 | Hobson et al. |
| 2005/0018889 A1 | 1/2005 | Li |
| 2005/0078881 A1 | 4/2005 | Xu et al. |
| 2005/0238223 A1* | 10/2005 | Guhring et al. ............. 382/154 |
| 2006/0002601 A1* | 1/2006 | Fu et al. ................... 382/132 |
| 2006/0002615 A1 | 1/2006 | Fu et al. |
| 2006/0002630 A1 | 1/2006 | Fu et al. |

OTHER PUBLICATIONS

F. Wang et al., "Cumulative Residual Entropy, A New Measure of Information & Its Application to Image Alignment", Proceedings of the Ninth IEEE International Conference on Computer Vision (ICCV '03), 2003 IEEE.

Josien, P.W. Pluim et al., "Mutual Information Based Registration of Medical Images: A Survey", IEEE Transactions on Medical Imaging, vol. XX, No. Y, 2003.

Van de Casteele et al., An Energy-Based Beam Hardening Model in Tomography, Nov. 12, 2002, Physics in Medicine and Biology, vol. 47, No. 23, pp. 4181-4190.

E. Coste-Maniere, D. Olender, W. Kilby, R.A. Schulz, Robotic whole body stereotactic radiosurgery: clinical avantages of the CyberKnife® integrated system, Int. J. Medical Robotics and Computer Assisted Surgery 2005; 1(2):28-39, 2005.

PCT Search Report, International Application No. PCT/US06/24819 filed Jun. 23, 2006, mailed Oct. 5, 2007.

PCT Written Opinion of the International Searching Authority, International Application No. PCT/US06/24819, filed Jun. 23, 2005, mailed Oct. 5, 2007.

* cited by examiner

Cervical Example

```
//set modelview to identity
glMatrixMode (GL_MODELVIEW);
glPushMatrix();
glLoadIdentity();
glTranslated(translation[0], translation[1], translation[2]);

//setup the tex gen
glTexGenfv(GL_S,GL_EYE_PLANE,xPlane);
glTexGenfv(GL_T,GL_EYE_PLANE,yPlane);
glTexGenfv(GL_R,GL_EYE_PLANE,xPlane);

glColor3f(1.0f, 1.0f, 1.0f);

glEneble(GL_TEXTURE_GEN_S);
glEnable(GL_TEXTURE_GEN_T);
glEnable(GL_TEXTURE_GEN_R);

//bind the correct texture
glBindTexture(GL_TEXTURE_3D_EXT, pTextureObj->GetTex3DID());

if (eSceneType == eScene_DRR_A || eSceneType == eScene_DRR_B)
{
        glClearAccum(0.0, 0.0, 0.0, 0.0);
        glClear(GL_ACCUM_BUFFER_BIT);

for (ii = 0; ii < slices; ii++)
        {
                z = m_dHAlfDiagonalSpace * (2.0 * ii / (slices - 1.0) - 1.0);
                glBegin(GL_QUADS);
                        glVertex3d(-m_dHalfDiagonalSpace, -m_dHalfDiagonalSpace, z);
                        glVertex3d( m_dHalfDiagonalSpace, -m_dHalfDiagonalSpace, z);
                        glVertex3d( m_dHalfDiagonalSpace, m_dHalfDiagonalSpace, z);
                        glVertex3d(-m_dHalfDiagonalSpace, m_dHalfDiagonalSpace, z);
                glEnd();
                glAccum(GL_ACCUM, 1.0f / slices);
        }
        glAccum(GL_RETURN, 1.0f);
} glMatrixMode (GL_TEXTURE);
glPopMatrix();
glMatrixMode(GL_MODELVIEW);
glPopMatrix();

glDisable (GL_TEXTURE_GEN_S);
glDisable (GL_TEXTURE_GEN_T);
glDisable (GL_TEXTURE_GEN_R);
```

FIG. 13

DRR GENERATION AND ENHANCEMENT USING A DEDICATED GRAPHICS DEVICE

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to imaging processing. More particularly, this invention relates to digitally reconstructed radiographs (DRR) generation and enhancement using a dedicated graphics device.

BACKGROUND

In image registration, an optimal transformation is preferred between different image acquisitions of one or more objects. Image registration techniques may be used in a medical field to relate a pre-operative image of a patient's anatomy to a near real time image of the patient during actual treatment. During a radiosurgery, for example, changes in target position at the time of treatment, as compared to its position at the time of the diagnostic treatment planning, may be detected. This may be accomplished by registering the 2D image acquired at a treatment time with the 3D scan data obtained at the time of treatment planning. A robust and accurate 2D-3D image registration algorithm may enable the position of the target, as viewed in the real-time 2D image, to be properly correlated with the pre-operative 3D scan. In practice, a formal mathematical transformation may be derived that best aligns the pre-operative image coordinate system with the patient's physical world coordinate system, defined for example in the treatment room.

Fiducial markers may be attached to or implanted within a patient before the pre-operative images are acquired, in order to accomplish a point-based alignment of the different coordinate systems. These fiducial markers are typically designed so that they can be localized relatively accurately in the pre-operative image, as well as in the real physical world. The respective localization points may then be used to calculate a rigid body transformation between the two coordinate systems.

The tracking of fiducials can be difficult for the patient. For example, a high accuracy tends to be achieved by using bone-implanted fiducial markers, but less invasive techniques such as skin-attached markers or anatomical positions tend to be less accurate. Implantation of fiducials into a patient may be painful and difficult, especially for the C-spine. The implantation process for which may frequently lead to clinical complications. Attempts have therefore been made to develop techniques for fiducial-less tracking.

By using anatomical structures, such as skeletal or vertebral structures, as reference points, the need for fiducial markers (and ensuing surgical implantation) may be reduced or eliminated in image-guided surgery. A fiducial-less tracking system and method, which relies on skeletal structures as references, may reduce the need for fiducial markers.

Typically, in a 2D-3D image registration, DRRs (digitally reconstructed radiographs) are reconstructed from the pre-operative 3D images, after which image registration is performed between the DRRs and the real-time 2D projection images. Although fiducial-less tracking that relies on skeletal structures may overcome many of the drawbacks associated with implanted fiducials, these skeletal structures may frequently not be easily visible, or may even be hidden, in the pre-operative DRRs.

Furthermore, some or all of the above operations are typically implemented at software at application level. The above operations may be sequentially performed by the software which is relatively slow and time consuming.

BRIEF DESCRIPTION OF THE DRAWINGS

The present invention is illustrated by way of example and not limitation in the figures of the accompanying drawings in which like references indicate similar elements.

FIG. 13 is pseudo code representing a portion of a DRR generation process according to one embodiment of the invention.

DETAILED DESCRIPTION

DRR generation and enhancement using a dedicated graphics device are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Overview

For a radiosurgical treatment of tumorous targets, a task of fiducial-less tracking is to predict patient target movement between pre-operative patient CT scanning and patient radiation treatment, based on the skeletal structures. The target movement may be tracked by comparing the pre-operative 3D CT data and intra-operative x-ray 2D projection images (e.g., a 2D/3D image registration). A basic problem in image registration is to find the optimal transformation that relates different representations or images of the same object. A 2D/3D registration, determines a projection mapping or transformation, from a 3D to a 2D coordinate system, such that points in each space which correspond to the same anatomical point are mapped to each other. In one embodiment, the transformation is represented, for example, by a set of non-rigid transformation parameters $(dx_T, dy_T, dz_T, r, p, w)$, where $(dx_T, dy_T, dz_T)$ represent the translations of an object, which may be a treatment target, and $(r, p, w)$ represent global rigid rotations of the target.

In one embodiment, two orthogonal x-ray projections are used to derive these six parameters set forth above. In this embodiment, the registration in each projection is performed individually and the results of the registration for each projection are subsequently combined to obtain the six 3D transformation parameters. In other embodiments, however, different projections or combinations thereof may be used to derive the transformation parameters.

Figure 1A:
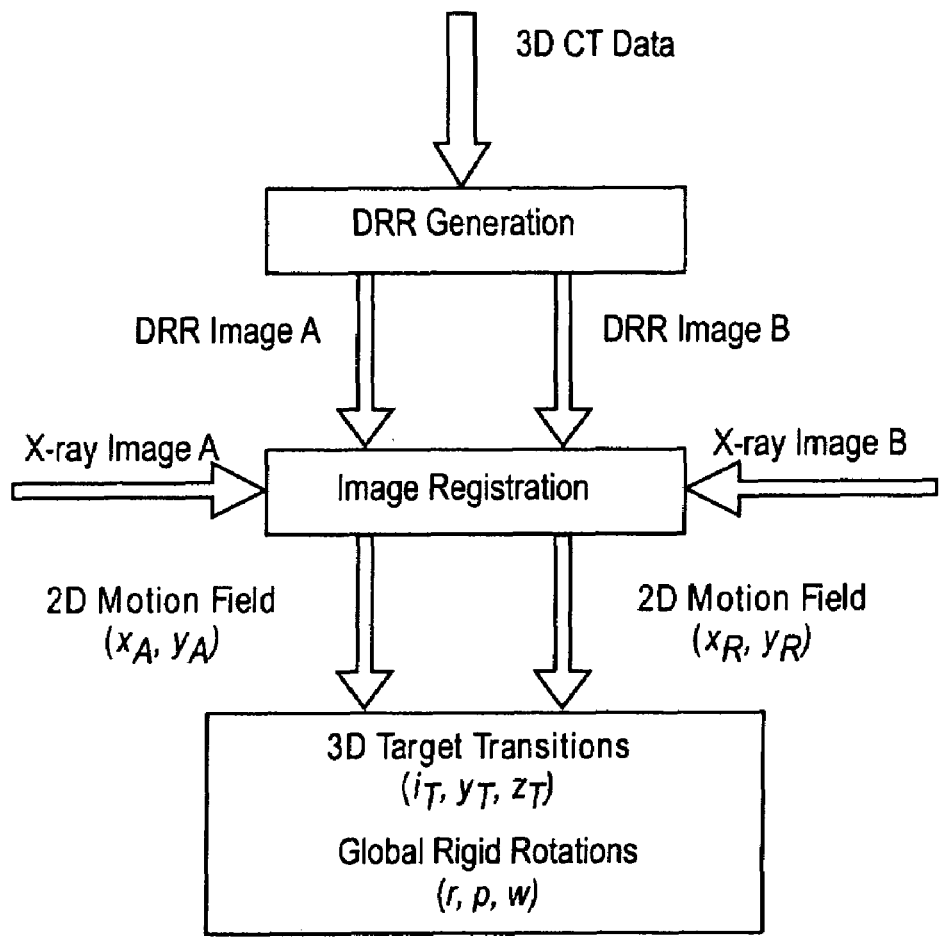
FIGS. 1A and 1B are diagrams illustrating a fiducial-less tracking system according to certain embodiments of the invention.

FIG. 1A is a block diagram of a fiducial-less tracking system according to one embodiment. Referring to FIGS. 1A, 2D-3D non-rigid image registration is performed for each of a pair of orthogonal projections A and B. For each projection, digitally reconstructed radiographs (DRRs) are first generated from the 3D CT scan data. As shown in FIG. 1A, the projection images A and B, acquired intra-operatively in near real time, are registered onto their respective DRRs. To determine a change in patient position and orientation between the time of the pre-operative CT scan and the time of radiosurgical treatment, local motion fields $(dx_A, dy_A)$ and $(dx_B, dy_B)$ are estimated in 2D, by using similarity measures to compare the pixel intensities in the x-ray images and the DRR images. A 3D motion field is derived from the 2D local motion fields. A full 3D motion field, derived from the local motion fields, includes 3D target translations $(dx_T, dy_T, dz_T)$ and global rigid rotations $(r, p, w)$, which are a set of non-rigid transformation parameters that represent the difference in the position and orientation of the treatment target, as shown in the projection images A and B, as compared to the position and orientation of the treatment target, as shown in the DRRs.

Figure 1B:
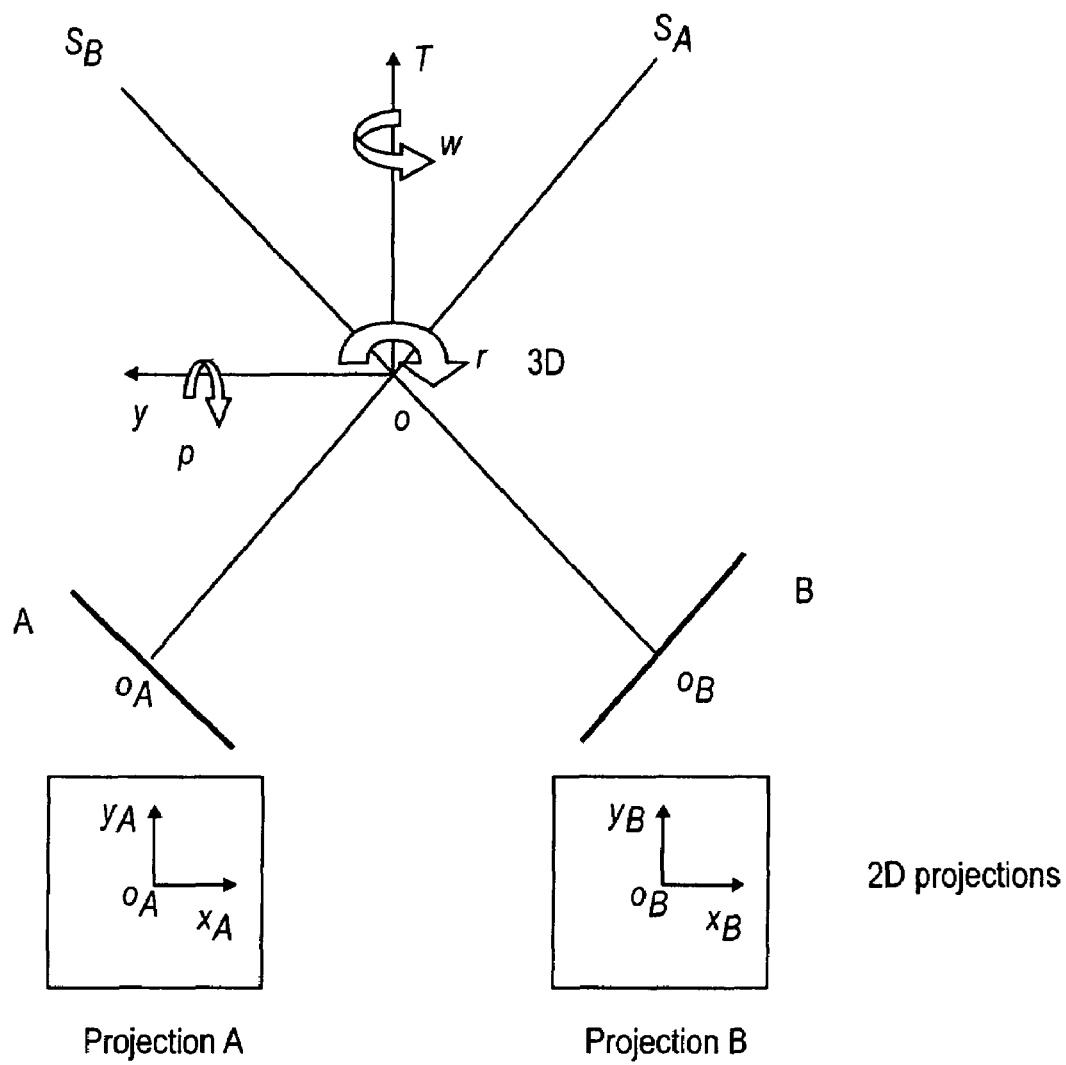

FIG. 1B is a block diagram illustrating geometric relations between a three-dimensional (3D) treatment target and two orthogonal 2D x-ray projections during an image registration according to one embodiment. Referring to FIG. 1B, a pair of cameras (or image receivers) A and B receives their x-ray projections from respective x-ray sources (not shown). In a coordinate system of the 3D scan, the x-axis is directed inward into a paper (not shown in FIG. 1B). As explained above, the change in position of the treatment target is represented by three translations and three global rigid rotations (e.g., dx, dy, dz, r, p, w).

Referring to FIG. 1B, the orthogonal 2D projections A and B are viewed from the directions $o_A s_A$ and $o_B s_B$, respectively. For each of the projections A and B, FIG. 1B illustrates respective 2D planar coordinate systems that are fixed with respect to an image plane that characterizes each projection. The image planes A and B for the projections A and B are thus defined by mutually orthogonal axes within the respective coordinate systems. These axes are shown as $(x_A, y_A)$ for projection A, and $(x_B, y_B)$ for projection B. The direction of the axis $x_A$ in the 2D coordinate system for projection A and the direction of the x-axis in the 3D scan coordinate system are opposite with respect to each other. The direction of axis $x_B$ in the coordinate system for projection B and the direction of the axis x in the 3D scan coordinate system are the same.

For projection A, the 2D motion field $(dx_A, dy_A)$ is estimated by registering the x-ray image projected onto the image plane A with the corresponding reference DRR image. For projection B, the 2D motion field $(dx_B, dy_B)$ is estimated by registering the x-ray image projected onto the image plane B with the corresponding reference DRR image. Given the 2D motion fields $(dx_A, dy_A)$ for projection A and $(dx_B, dy_B)$ for projection B, the 3-D target translation $(dx_T, dy_T, dz_T)$ and the global rigid rotations $(r, p, w)$ can be obtained for both projections A and B by, for example, a straightforward mathematical operation.

Figure 2:
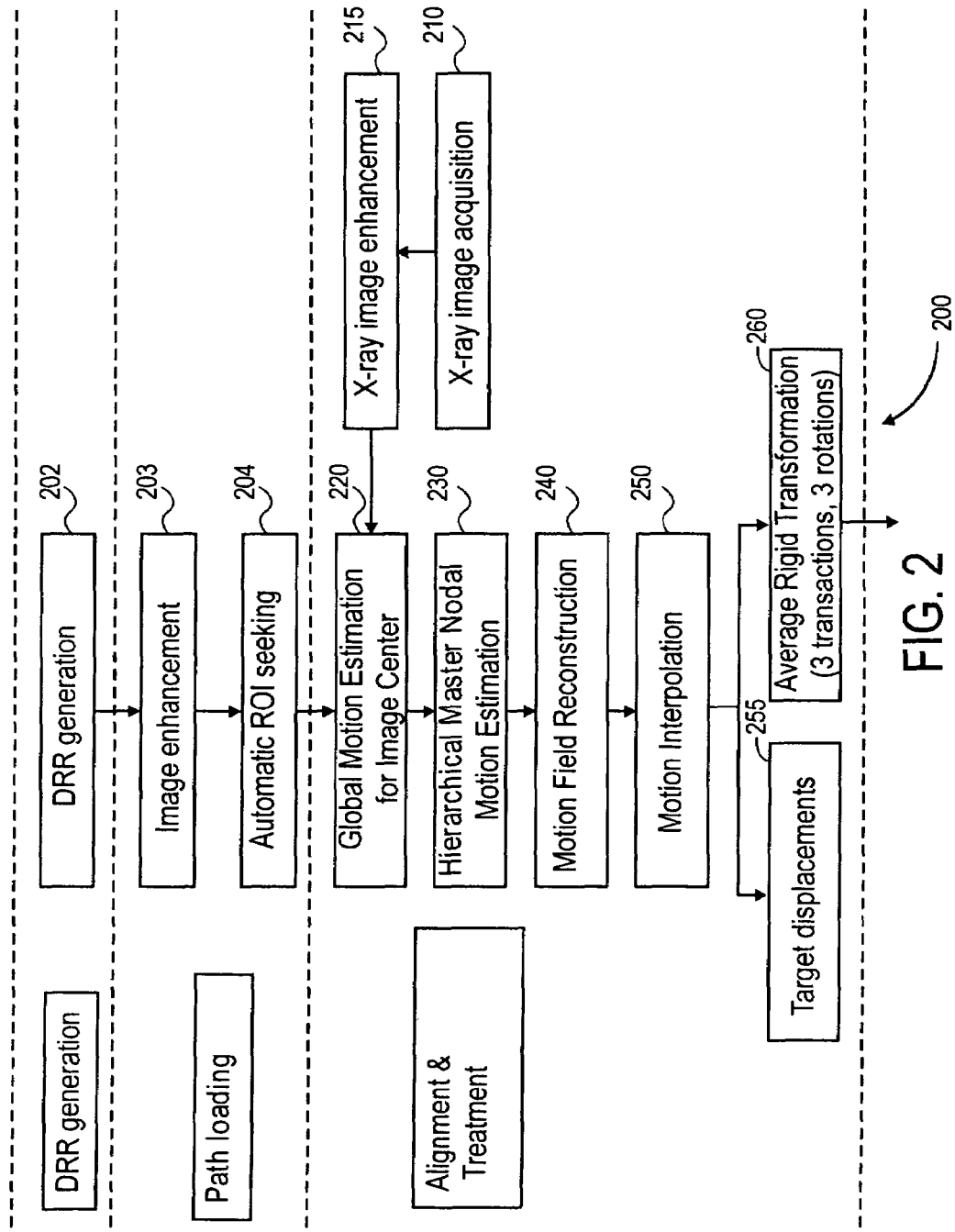
FIG. 2 is a diagram illustrating a non-rigid image registration algorithm used with an embodiment of the invention.

FIG. 2 is a flow diagram of a process according to a non-rigid image registration algorithm, according to one embodiment of the invention. Referring to FIG. 2, a registration algorithm is used for a 2D/3D registration performed for each projection described in FIG. 1B. In particular, according to one embodiment, non-rigid image registration is performed between a 2D DRR (reconstructed from pre-operative CT scan data) of a patient's target region and an intra-operative (near real-time) x-ray projection image of the target region.

Referring to FIG. 2, at block 202, 2D DRRs (digitally reconstructed radiographs) may be generated from pre-operative 3D scan data. An improved DRR generation process can be implemented in block 202 to bring out the skeletal structures, which are usually not easily visible in the images or even may be hidden. In block 202, the CT scan data are modified based on a non-linear attenuation model that emphasizes the skeletal structures and thus improves the quality of the DRRs.

An image registration may be performed in a selected region of interest (ROI) within the enhanced DRR to improve an efficiency. According to one embodiment, an ROI is defined in the DRR, in block 204, after enhancement of the DRRs. An ROI selection process that is performed based on image entropy, is fully automatic and does not require user interaction. Intra-operative 2D x-ray projection images are then generated, in near real time in block 210. Image enhancement is performed on the x-ray images, in block 215, using a top-hat filter as in block 203.

A non-rigid image registration is then performed between the enhanced x-ray images and the enhanced DRR, within the ROI. In particular, according to one embodiment, a similarity measure is used to compare the pixel intensities in the x-ray images and the DRR images to determine any change in the position, orientation, and/or physiological deformation of the patient. In blocks 220-250, a non-rigid deformation that describes real patient movement and body deformation is defined. To define the non-rigid deformation, according to one embodiment, a full motion field is constructed including various local motion fields (e.g., multiple locally estimated motion vectors). To estimate local motion at a given point of interest within the ROI, according to one embodiment, a similarity measure based on pattern intensity is used to compare pixel intensities.

A full motion field including multiple local motions can describe a desired non-rigid deformation. Further, a full motion field derived in this manner can account for non-rigid motions (e.g., translations and/or rotations) of an object, in addition to non-rigid deformations between different image acquisitions of the object. In order to efficiently compute the local motion vectors at a point of interest within the ROI, according to one embodiment, hierarchical mesh motion estimation and multi-level block matching (e.g., in conjunction with an intensity-based similarity measure) are performed. These methods allow a fast computation of the image registration, for example, using algorithm 200. A smoothness constraint may be imposed to reconstruct the motion field at mesh nodes in which mismatching occurred. The non-rigid transformation parameters for the non-rigid image registration are then computed from the full motion field.

Referring to FIG. 2, the non-rigid deformations described by a full motion field occur between the acquisition of the 3D CT scan data of a treatment target region in a patient and the acquisition of the x-ray projection images of the target region. In block 220, a global translation of the entire image is first estimated. The estimated global translation is used as the initial estimate for all further local motion estimation. In block 130, mesh nodal motion estimation is performed using a hierarchical mesh structure designed to estimate the local motion in multiple levels.

In the block 240, a motion field reconstruction is performed for those mesh nodes in which a mismatch occurs in one embodiment, the reconstruction of the motion field is performed by imposing a smoothness constraint based on an assumption that local motions are continuous because of matter coherence. In block 250, a local motion vector at any desired point of interest is derived by interpolating from the nodal motions estimated for the mesh nodes that surround the point of interest. The full motion field is then constructed using the local motion vectors derived for one or more desired points of interest.

In block 255, target displacements are derived from the full motion field. In block 260, an average rigid transformation is derived from the full motion field.

System Overview

Figure 3:
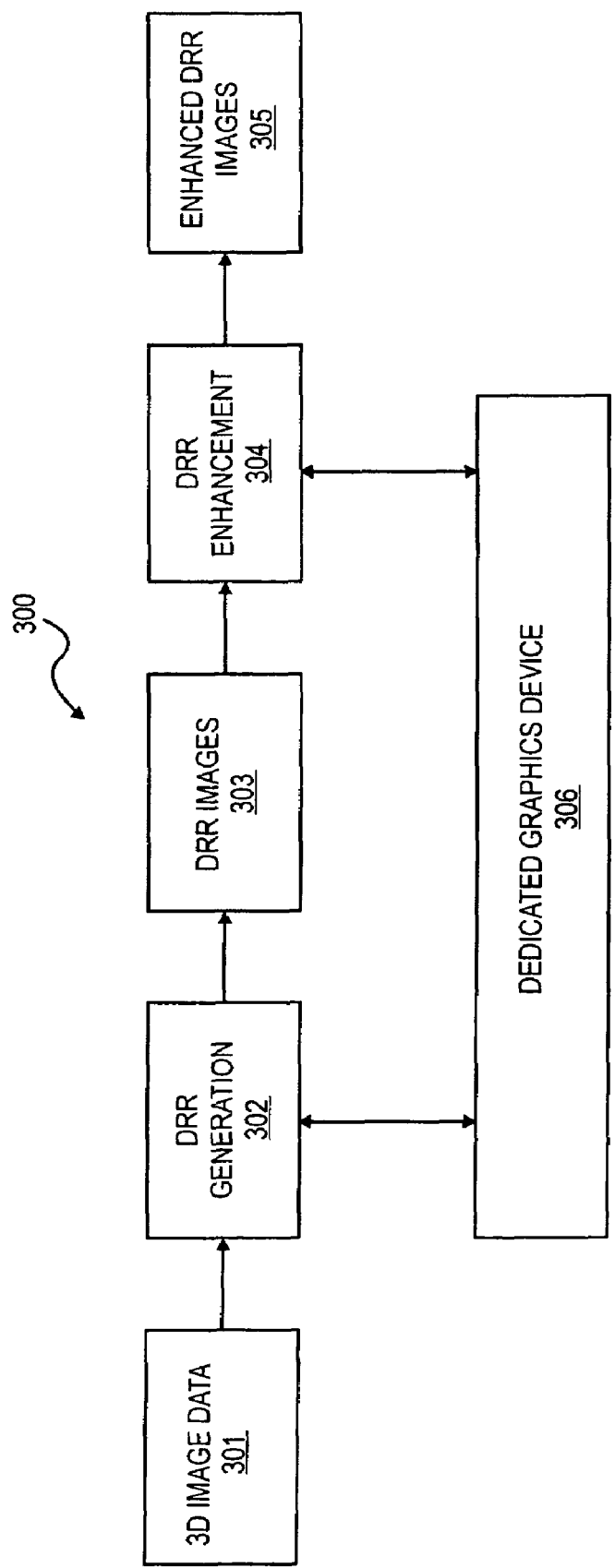
FIGS. 3 and 4 are block diagrams illustrating an example of DRR processing system according to one embodiment of the invention.

According to one embodiment, a dedicated graphics device may be used to perform at least a portion of DRR generation and enhancement operations. FIG. 3 is a block diagram illustrating a system for DRR generation and enhancement according to one embodiment of the invention. Referring to FIG. 3, system 300 includes a DRR generation unit 302, in response to 3D image data 301, to generate DRR image data 303. The 3D image data may be received in real-time and/or over a network. The 3D image data may be CT (computer tomography) scan data. Throughout this application, CT scan data is used as an example of 3D image data. However, it is not so limited. Other types of image data, such as scan data from PET (positron emission tomography), MRI (magnetic resonance imaging), and/or ultrasound may be used as 3D image data.

Referring back to FIG. 3, according to one embodiment, the DRR generation unit 302 may invoke a dedicated graphics device 306 to perform at least a portion of DRR generation processes. For example, DRR generation unit 302 may load a customized program for generating DRR images into the dedicated graphics device 306 to perform at least a portion of the DRR generation operations. The dedicated graphics device 306 may be implemented as hardware or a combination of hardware and software. For example, the dedicated graphics device 306 may include a graphics processor manufactured from a variety of vendors, such as, for example, NVIDIA Corporation of Santa Clara, Calif. or ATI Technologies, Inc. of Ontario, Canada, etc.

In one embodiment, the DRR generation unit 302 may load a volume rendering program, also referred to as a shader program, into the dedicated graphics device 306 which may be executed substantially in parallel. The shader program may be written in a variety of programming languages, such as, for example, C/C++ and/or Assembly, etc. The shader program may be written in accordance with a predetermined algorithm, which will be described in further detail below. The shader program may be executed by the dedicated graphics device 306.

In one embodiment, in response to the DRR images 303 generated by the DRR generation unit 302 by invoking dedicated graphics device 306, DRR enhancement unit 304 may perform further DRR enhancement operations to generate the enhanced DRR images 305. Similar to DRR generation unit 302, according to one embodiment, DRR enhancement unit 304 invokes a dedicated graphics device, which may be implemented as a part of dedicated graphics device 306 or a separate device. In one embodiment, a DRR enhancement routine is designed in accordance with a predetermined algorithm, which will be described in details further below. Similar to the shader program, the DRR enhancement routine may be loaded into the dedicated graphics device and executed by the dedicated graphics device substantially in parallel.

In one embodiment, the dedicated graphics device 306 may be implemented as a dedicated graphics processing device inserted into a bus of a data processing system, such as, for example, a personal computer (PC) or a workstation. Alternatively, the dedicated graphics device may be implemented as a part of a video adapter of a computing system, such as, a PCI (peripheral component interface) video card or an acceleration graphics port (AGP) compatible video card. The dedicated graphics device 306 may include one or more programmable general-purpose or special-purpose microprocessors or digital signal processors (DSPs), microcontrollers, application specific integrated circuits (ASICs), programmable logic devices (PLDs), or a combination of such devices. In one embodiment, the DRR generation unit 302 and DRR enhancement unit 304 may communicate with the dedicated graphics device 306 via an interface, such as, for example, OpenGL (Open Graphics Library) and/or DirectX interfaces, as shown in the architecture of FIG. 4.

In one embodiment, the dedicated graphics device 306 is able to process more than 15 frames per second on a single processor platform (e.g., a single CPU platform). Further, the dedicated graphics device 306 may include at least 4 texture pipelines and each pipeline can process voxel compositing (e.g., for DDR generation and enhancement) independently and substantially concurrently.

Figure 4:
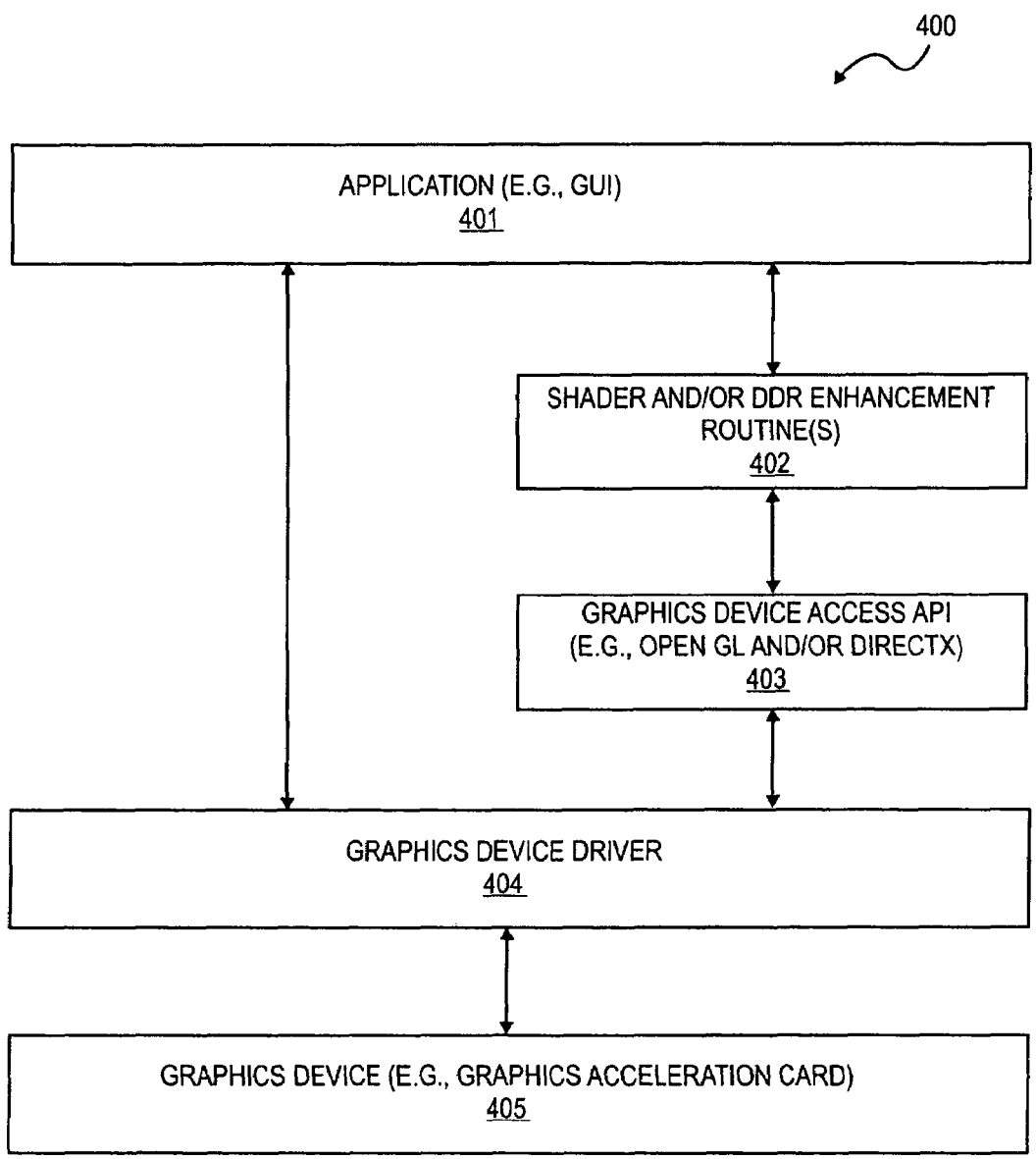
Figure 7A:
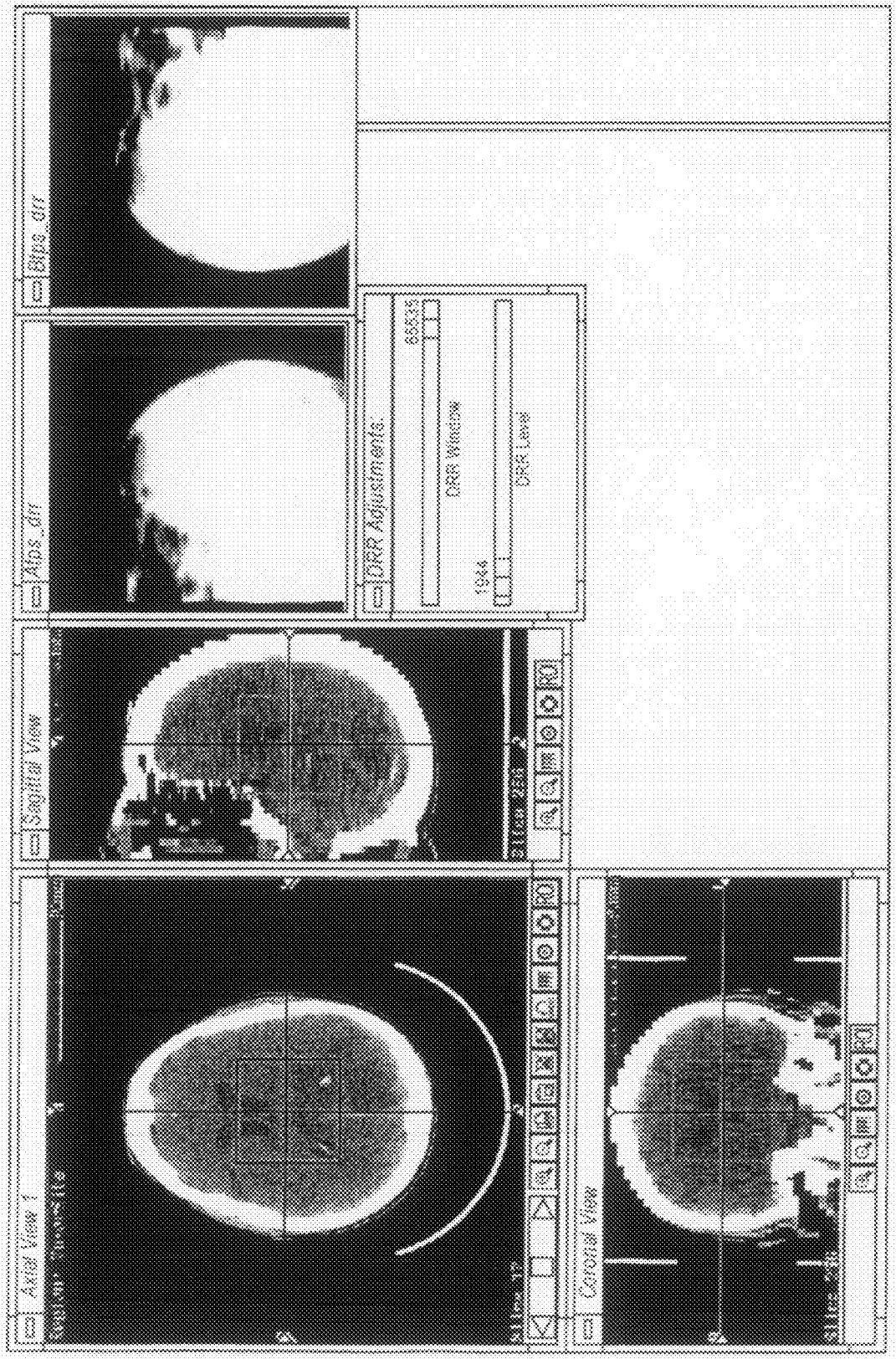
FIGS. 7A and 7B are diagram illustrating DRR images generated according to linear and nonlinear attenuation models.
Figure 7B:
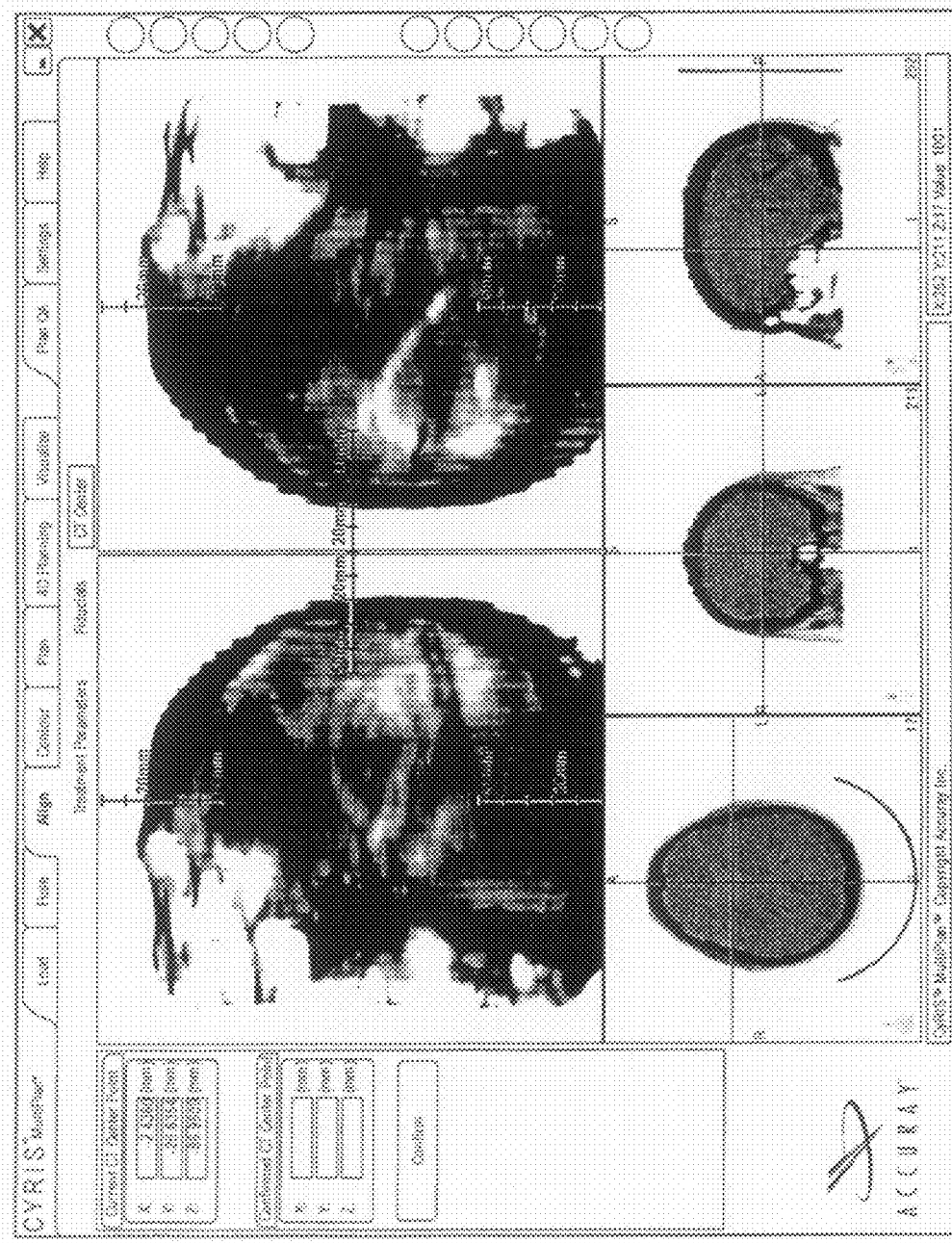

FIG. 4 is a block diagram illustrating a system architecture according to one embodiment of the invention. System architecture 400 may represent at least a portion of system 300 of FIG. 3. Referring to FIG. 4, an application 401 communicates with a display driver 404 in order to access a graphics device (e.g., a video adapter) to display data (e.g., 3D images or DRR images) to a display device (not shown). Application 401 may include a graphical user interface (GUI) to interact with a user. For example, application 401 may be implemented as a part of CyRIS Multiplan® available from Accuray, Inc. of Sunnyvale, Calif., as shown in FIG. 7B.

In addition, a customized routine 402, such as, for example, a shader program related to DRR generation and/or a DRR enhancement routine may be implemented and communicated with the application 401. In one embodiment, the routine 402 may be loaded into a dedicated graphics device, which may be implemented as part of a video adapter 405 or a separate device, via a graphics device API (application programming interface) 403 and the associated graphics device driver 404. The graphics device interface 403 may be compatible with OpenGL or DirectX.

The graphics device driver 404 may be provided by a vendor of the graphics device 405. Alternatively, graphics device driver 404 may be provided by a vendor of an operating system (OS) running within the system. The OS (not shown) may be a Windows OS from Microsoft Corporation of Washington or a Mac OS from Apple Computer of California. Alternatively, the OS may be a Unix, Linux, or other operating systems (e.g., embedded or real-time operating system), etc. Other components may also be implemented.

DRR Generation Examples

Figure 5:
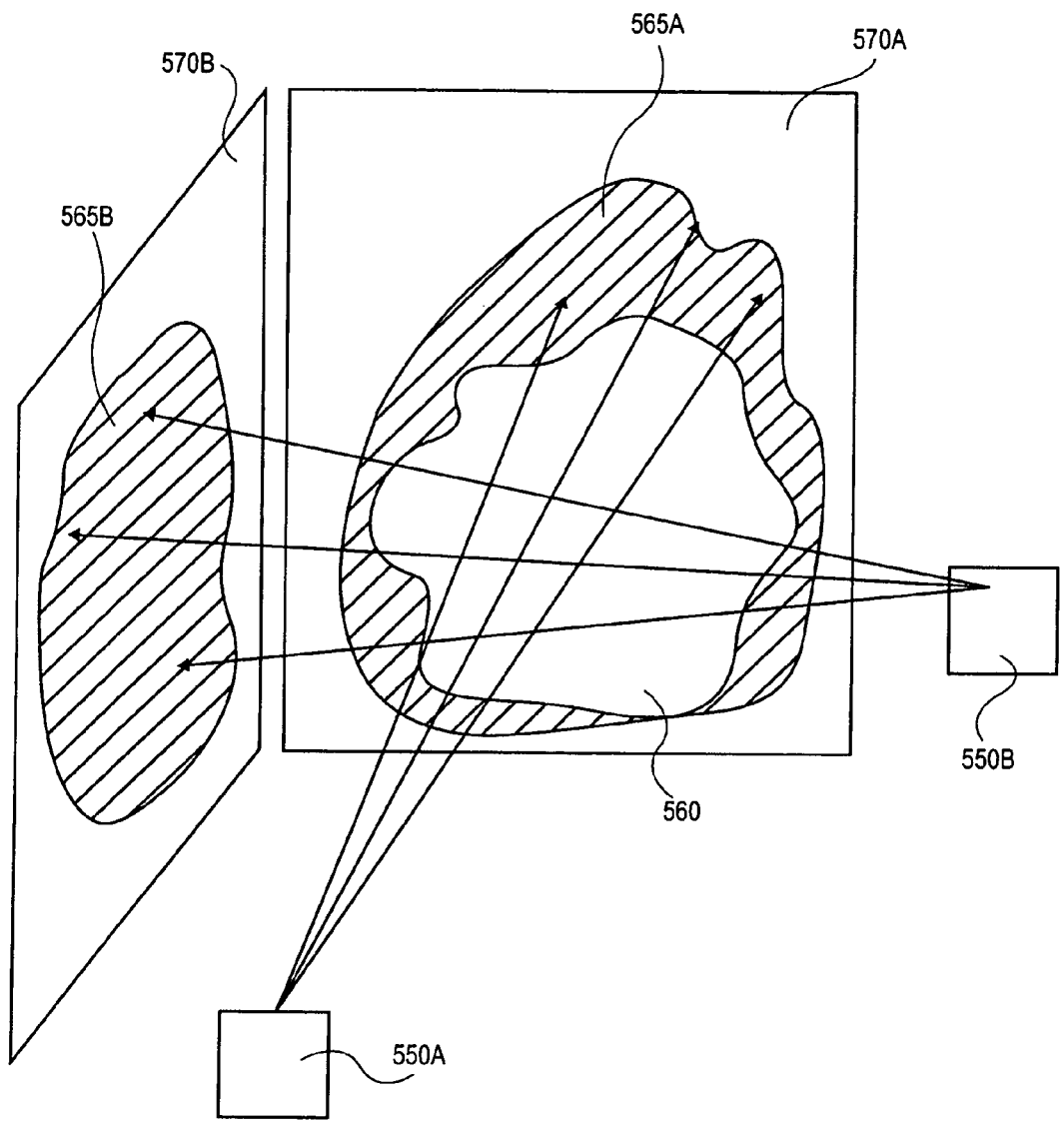
FIGS. 5 and 6 are diagrams illustrating a non-linear attenuation model used with one embodiment of the invention according to certain embodiments of the invention.

FIG. 5 a block diagram illustrating a generation of 2D DRRs from 3D scan data according to one embodiment of the invention. The operations involved in FIG. 5 may be performed in block 202 in FIG. 2. Referring to FIG. 5, a volumetric 3D CT image of the target is schematically referred to using reference numeral 560. The DRRs 565A and 565B, shown in FIG. 5, are artificial and synthesized 2D images that represent a radiographic image of the target that would be obtained if imaging beams, having substantially the same intensity, position and angle as the beams used to generate the real time x-ray projection images, were transmitted through the target, and if the target were positioned in accordance with the 3D CT scan data. The reference numerals 550A and 550B illustrate the hypothetical positions and angles from which the imaging beams would be directed through a target positioned in accordance with the CT volumetric image 560 of the target.

CT scans can generate a 3D image of the target object one axial slice at a time. Each axial CT slice can be viewed as being composed of multiple individual volume elements, also referred to as CT voxels. Each CT voxel is thus disposed within one of the axial voxel slices, each voxel slice representing a corresponding axial slice of the target object. Each CT voxel is characterized by a numerical value, also referred to as a CT number, which represents the x-ray attenuation characteristics of the corresponding CT voxel. A CT image of a target object can be viewed as a map or distribution within the object of a 3D array of CT numbers. The reconstruction of a CT image thus requires an accurate measurement of the x-ray attenuations and an accurate determination of CT numbers.

Typically, DRRs are generated by casting hypothetical beams or rays through the CT volumetric image of the target. Each ray goes through a number of voxels of the 3D CT image 560. By integrating the CT numbers for these voxels along each ray and projecting onto an imaging plane (shown as 570A and 570B, respectively, in FIG. 5), the resultant image would emulate the radiograph that would be obtained by passing rays from hypothetical locations (550A and 550B, respectively) through a target positioned in accordance with the volumetric 3D image 560. The sum of CT numbers is performed from the source point of the hypothetical ray onto a plane orthogonal to the central axis of the hypothetical beam. The sum is performed along each ray using in part an interpolated value contributed by each voxel through which the ray passes. Each voxel contribution is interpolated over orthogonal segments along the beam path. Various ray tracing algorithms apparent to one with ordinary skill in the art may be used when generating DRRs.

Applications such as an image-guided radiosurgery require that the comparison between the DRRs and the real-time x-ray images, as well as the subsequent adjustment of the position of the x-ray source, be made very rapidly and accurately. In practice, the accuracy should be below 1 mm and the computation time should be on the order of a few seconds. Unfortunately, it is difficult to meet both requirements simultaneously. For example, two different modality images (e.g., CT scan images and x-ray images) have different spatial resolution and image quality. Generally, an x-ray image resolution and quality are superior to the resolution and quality of DRR images, which are corresponding synthesized images. Typically, some structures in the DRR may appear more blurred (especially normal to the CT slice plane) compared to the x-ray image. Ideally, an optimal similarity measure for a 2D/3D registration process should allow for an accurate registration to be achieved, despite such differences. Also, DRR generation relies on a proper attenuation model. Because attenuation is proportional to the mass intensity of the target volume through which the beam passes, the exact relationship between the traversed mass intensity and the CT image intensity needs to be known in order to obtain an accurate modeling. Establishing this relationship is relatively difficult, however, so typically the linear attenuation model is often used in conventional methods and systems for DRR generation.

The linear attenuation coefficient of a material is dependent on x-ray energy. However, CT machines and x-ray machines work at different effective energies. As a result, the attenuation coefficients measured by a CT scanner are different from the attenuation of a beam of x-rays passing through the target. The skeletal structures in DRR images cannot be reconstructed very well using the linear model. With the CT scan x-ray energies, the ratio of bone-to-soft-tissue attenuation is much lower than at the x-ray radiographic projection energies. Thus, in a DRR produced from a 3D CT volume, the image contrast from soft tissue tends to be comparable with the image contrast from bone, reducing the clarity of bone details, for example, as shown in FIG. 7A.

The quality of DRR images relies on proper attenuation modeling, as well as a proper interpolation scheme for interpolation of the CT numbers. In one embodiment, an improved DRR generation is accomplished during operation 202 of FIG. 2, by formulating an improved x-ray attenuation model for fiducial-less tracking, so that the DRRs become more like the real x-ray projection images. A linear attenuation model is no longer assumed, and the CT numbers are modified to compensate for the above-mentioned a difference in the bone-to-tissue attenuation ratio.

According to one embodiment, the following empirical equation may be needed to modify the original CT numbers:

$$C(x,y,z)=a\ C_0(x,y,z)e^{bC_0(x,y,z)} \quad (1)$$

where $C(x,y,z)$ represents the modified CT number of a 3D CT voxel located at a point $(x,y,z)$; $a$ and $b$ represent weighting coefficients; and $C_0(x,y,z)$ represents the unmodified CT number, based on a linear attenuation model, of a 3D CT voxel having a location $(x,y,z)$.

Figure 6:
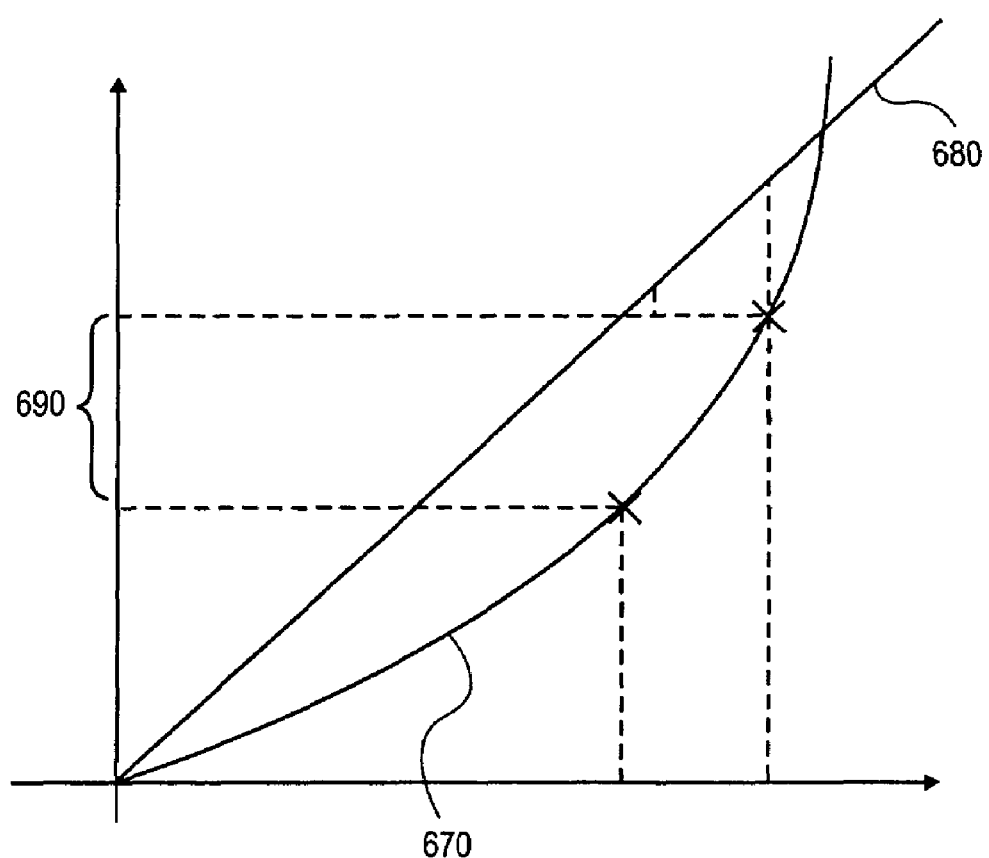

FIG. 6 is a diagram illustrating a schematic plot of the equation set forth above according to one embodiment of the invention. Referring to FIG. 6, in one embodiment, the curve identified by reference numeral 670 represents CT numbers resulting from the non-linear attenuation model provided by the empirical formula (1), whereas the curve identified by reference numeral 680 represents CT numbers resulting from a linear attenuation model. After modification of the CT numbers using equation (1), skeletal structures in the images are emphasized, and soft tissues are suppressed.

In other words, according to certain embodiments, use of the empirical formula (1) to process CT numbers during DRR generation serves to bring out the skeletal features against the tissue background, in the DRRs. In the region identified in FIG. 6 with reference numeral 690, the details of the rigid structures (e.g. skeletal structures) are more easily visible using the non-linear attenuation curve 690, since the details are spread over a broader range of intensity values, as compared to the linear attenuation curve 680. In one embodiment, the weighting coefficient "b" in equation (1) is 128 for 8-bit images, where the weighting coefficient "a" is slightly different for the cervical, thoracic and lumbar cases, respectively. FIG. 7B is a diagram illustrating DRRs generated using the non-linear attenuation techniques set forth above according to one embodiment.

According to certain embodiments of the invention, an interpolation scheme is used to further improve the quality of DRRs. In a particular embodiment, such an interpolation scheme may include a tri-linear interpolation. In this embodiment, the tri-linear interpolation is performed in operation 210 of FIG. 2, to integrate the CT numbers along the CT voxels that are encountered by each cast ray. In one embodiment, the tri-linear interpolation is followed by a 1-D polynomial interpolation over three voxel slices for each voxel of interest. The three voxel slices include a voxel slice containing the voxels of interest and each adjacent voxel slice.

Figure 8:
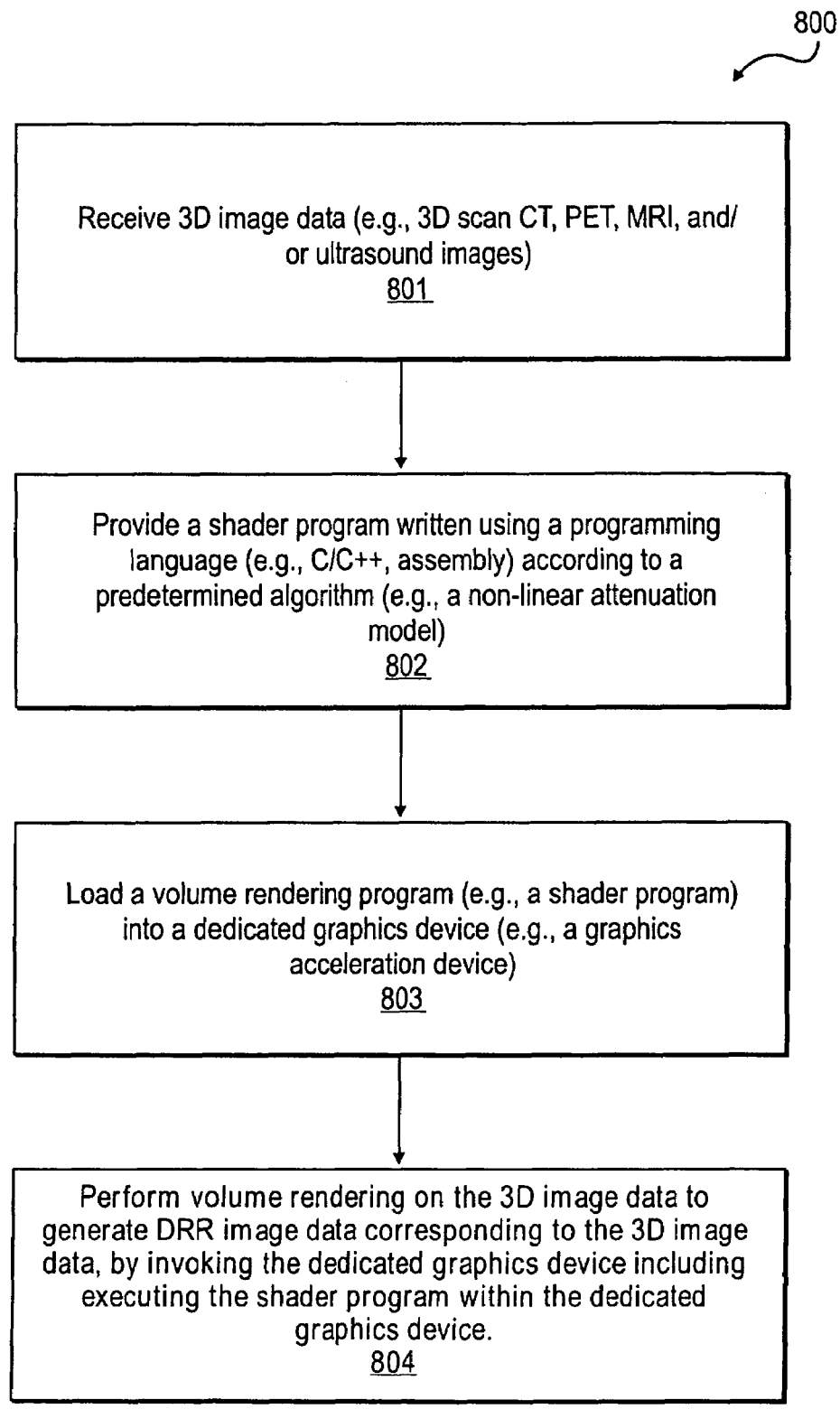
FIG. 8 is a flow diagram illustrating a process for DRR generation according to one embodiment of the invention.

In one embodiment, at least a portion of the above DRR generation operations may be performed via a dedicated graphics device, similar to dedicated graphics device 306 of FIG. 3. FIG. 8 is a flow diagram illustrating a process for generating DRR images using a dedicated graphics device, according to one embodiment of the invention. The process 800 may be performed by a processing logic that may comprise hardware (circuitry, dedicated logic, etc.), software (such as is run on a dedicated machine), or a combination of both. For example, process 800 may be performed by DRR generation unit 302, dedicated graphics device 306, or a combination of both as shown in FIG. 3.

Referring to FIG. 8, at block 801 according to one embodiment, 3D image data is received. The received 3D image data may be 3D scan data generated from a variety of sources, such as, for example, CT, PET, MRI, and/or ultrasound scan data. At block 802, a shader program is provided, for example, for volume rendering purposes. The shader program may be developed according to a predetermined algorithm using a variety of programming languages, such as, for example, C/C++ and/or assembly. In one embodiment, the shader program may be developed according to a non-linear attenuation technique described above, such as, for example, similar to the following algorithm (described above):

$$C(x,y,z) = a \cdot C_0(x,y,z) e^{b C_0(x,y,z)}$$

FIG. 13 is pseudo code representing a portion of the shader program using the OpenGL interface.

At block 803, the shader program may be loaded into a dedicated graphics device (e.g., a memory of the dedicated graphics processing device). At block 804, volume rendering is performed on the 3D image data to generate DRR images corresponding to the 3D image data by invoking the dedicated graphics device, including executing the loaded shader program within the dedicated graphics device to perform at least a portion of volume rendering operations. Other operations may also be performed.

DRR Enhancement Examples

Fiducial-less tracking relies on skeletal reference structures that are usually not easily visible, or may even be hidden in the DRRs and in the x-ray projection images. Because fiducial-less tracking is based on registration of such skeletal structures, both the DRR and the x-ray images have to be enhanced to bring out the details of the vertebral structures and improve their visibility. In one embodiment, an image enhancement may be performed for the DRRs and/or the x-ray projection images. In most thoracic and lumbar cases, the skeletal structures are not easily visible or even hidden in DRR and/or X-ray images. For these cases therefore, enhancement of the DRR and the x-ray images may be needed in order to make registration better. In cervical cases, the skeletal structures of spine are well visible in the DRR and/or the x-ray images, but the details of the structures are still relatively not clear. Accordingly, according to certain embodiments, the DRR and the x-ray images may be enhanced to improve the registration.

Figure 9:
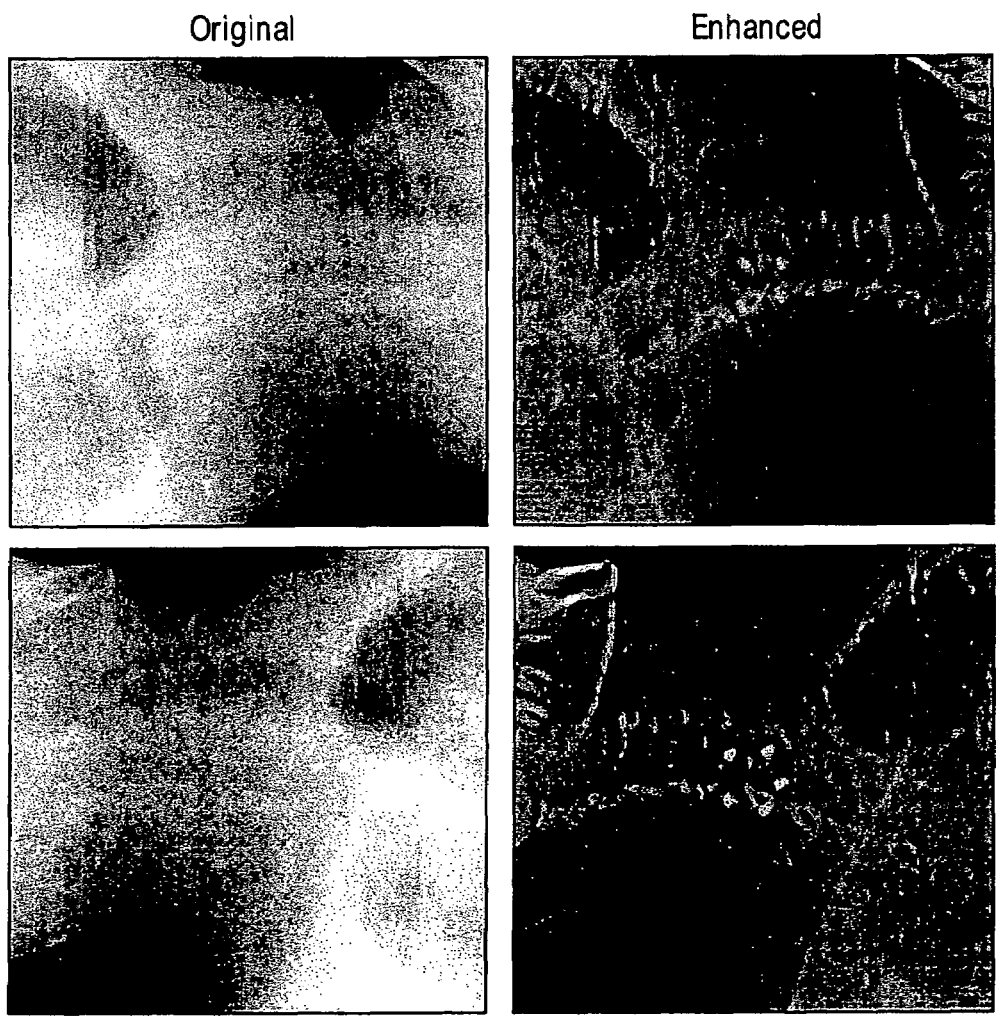
FIG. 9 is a diagram illustrating DRR images prior to and after DRR enhancement according to certain embodiments of the invention.

FIG. 9 illustrates DRR images that have been enhanced to increase the visibility of skeletal structures using top hat filtering according to one embodiment. In the embodiment illustrated in FIG. 9, a top-hat filter was designed and used to enhance the x-ray images (e.g., operation 215 in FIG. 2) and to enhance the DRR images (e.g., operation 203 in FIG. 2). In particular, the skeletal structures in the images have been enhanced (e.g., brought out, by applying a top hat filter operator to the pixels of the x-ray projection images and the DRR images).

A top hat filter is a nonlinear operator that finds the brightest pixels in two different size neighborhoods and keeps the extreme values. In one embodiment, if the brightest value in a smaller neighborhood region is greater that a value in the larger neighborhood by a predetermined threshold, such as, for example, an amount determined by a user, then the pixel remains, otherwise it is eliminated. As a result of applying a top hat filter to the images, it is possible to locate features of interest.

In one embodiment, the top-hat filter is designed by using a weighted combination of image opening and closing with a structural element. In one embodiment, the top hat filter operator is defined mathematically as follows:

$$f_e = f + w * [f - \gamma_B(f)] - b * [\varphi_B(f) - f] \qquad (2)$$
$$= f + w * WTH(f) - b * BTH(f)$$

where $f_e$ represents the enhanced image resulting from the application of the top hat filter operator to each pixel in the original image; f represents the original image; w and b represent weighting coefficients, $\gamma_B(f)$ represents a structural element for the opening of the original image f, and $\varphi_B(f)$ represents a structural element for the closing of the original image f.

In expression (2) above, $WTH(f) = f - \gamma_B(f)$ is referred to as a white top-hat filter, where $BTH(f) = \varphi_B(f) - f$ is referred to as a black top-hat filter. The structural elements $\gamma_B(f)$ and $\varphi_B(f)$ are masks that are used to perform a basic morphological operation. The sizes of the structural elements vary for cervical, thoracic, and lumbar applications. The empirical values may be determined experimentally. The weighting coefficients w and b may be determined adaptively by the amplitudes of WTH(f) and BTH(f), respectively. Empirically, according to certain embodiments, the values of the weighting coefficients w and b are about 1 each (w=1, b=1), for a cervical case in which less tissue is present. In a lumbar case in which more tissue is present, the values of w and b are greater than about 2 each (w>2, b>2). In the lumbar case, the weighting process brings out the skeletal structures to a greater degree compared with the cervical case.

In one embodiment, image registration is conducted only in a certain region of interest (ROI) defined in the DRR. The ROI includes the treatment target (e.g. a tumor or lesion). In one embodiment, image entropy is defined (e.g., operation 204 in FIG. 2). In this way, the ROI can be automatically selected for optimum registration, minimizing, and/or reduction of user interaction. Because image registration relies on the image content or image information, in one embodiment, the ROI is optimized to include as much information as possible.

According to one embodiment, at least a portion of the DRR enhancement operations set forth above may be performed by a DRR enhancement unit and/or a dedicated graphics device (e.g., DRR enhancement unit 304 and/or dedicated graphics device 306 as shown in FIG. 3).

Figure 10:
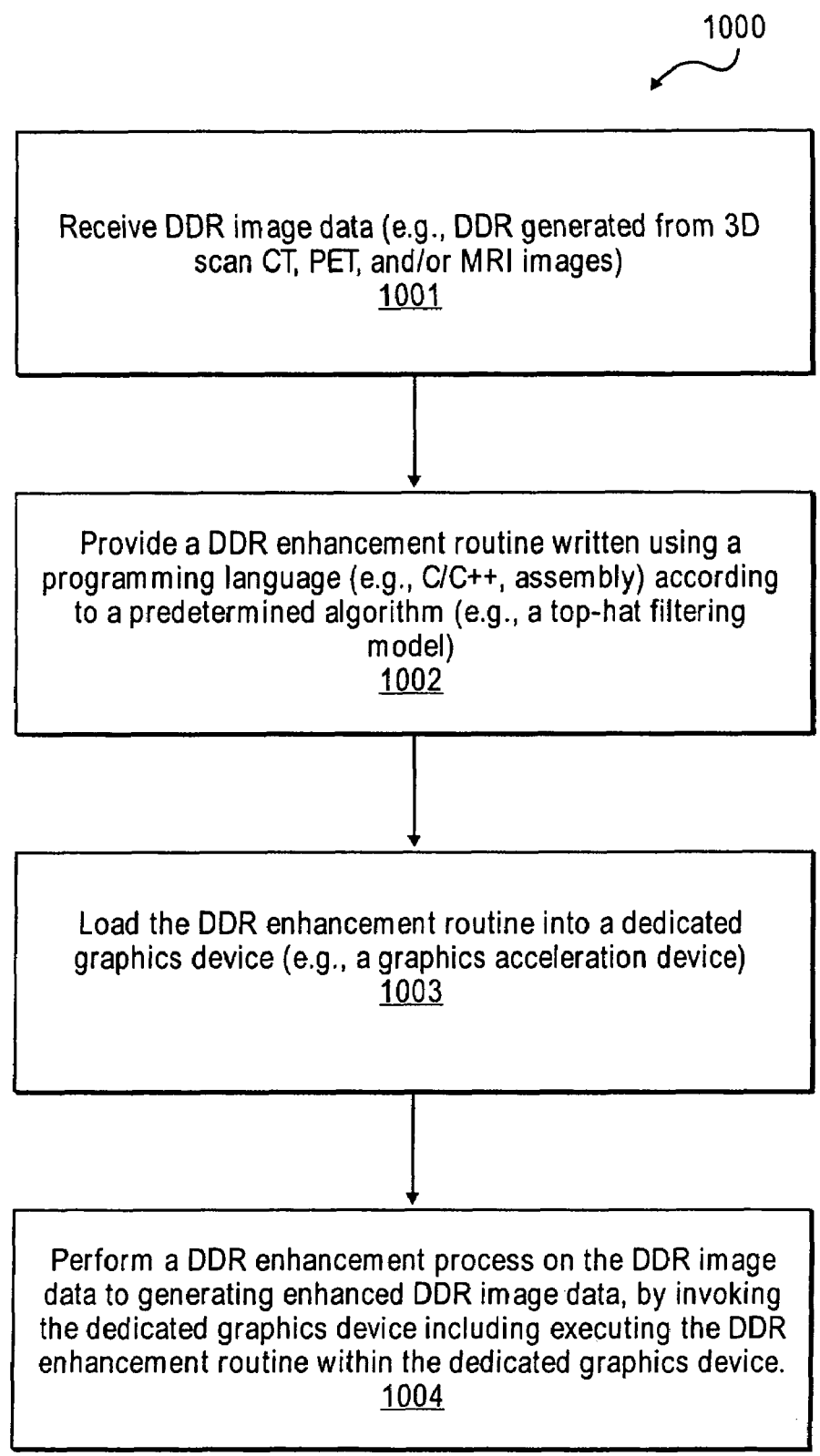
FIG. 10 is a flow diagram illustrating a process for DRR enhancement according to one embodiment of the invention.

FIG. 10 is a flow diagram illustrating a process for generating DRR images using a dedicated graphics device, according to one embodiment of the invention. The process 1000 may be performed by a processing logic that may comprise hardware (circuitry, dedicated logic, etc.), software (such as is run on a dedicated machine), or a combination of both. For example, process 1000 may be performed by DRR enhancement unit 304, dedicated graphics device 306, or a combination of both as shown in FIG. 3.

Referring to FIG. 10, at block 1001 according to one embodiment, DRR image data is received. The received DRR image data may be generated based on 3D scan data generated from a variety of sources, such as, for example, CT, PET, MRI, and/or ultrasound scan data. In one embodiment, the DRR image data may be generated according to process 800 of FIG. 8. At block 1002, a DRR enhancement routine is provided, for example, for enhancing DRR purposes. The DRR enhancement routine may be developed according to a predetermined algorithm using a variety of programming languages, such as, for example, C/C++ and/or assembly. In one embodiment, the DRR enhancement routine may be developed according to the formula described above, such as, for example, similar to the following algorithm (described above):

$$f_e = f + w^* [f - \gamma_B(f)] - b^* [\phi_B(f) - f]$$

At block 1003, the DRR enhancement routine may be loaded into a dedicated graphics device (e.g., a memory of the dedicated graphics processing device). At block 1004, DRR enhancement operations are performed on the DRR image data to generate the enhanced DRR images, by invoking the dedicated graphics device, including executing the loaded DRR enhancement routine within the dedicated graphics device to perform at least a portion of DRR enhancement operations. Other operations may also be performed.

Medical Diagnostic Imaging System Examples

Figure 11:
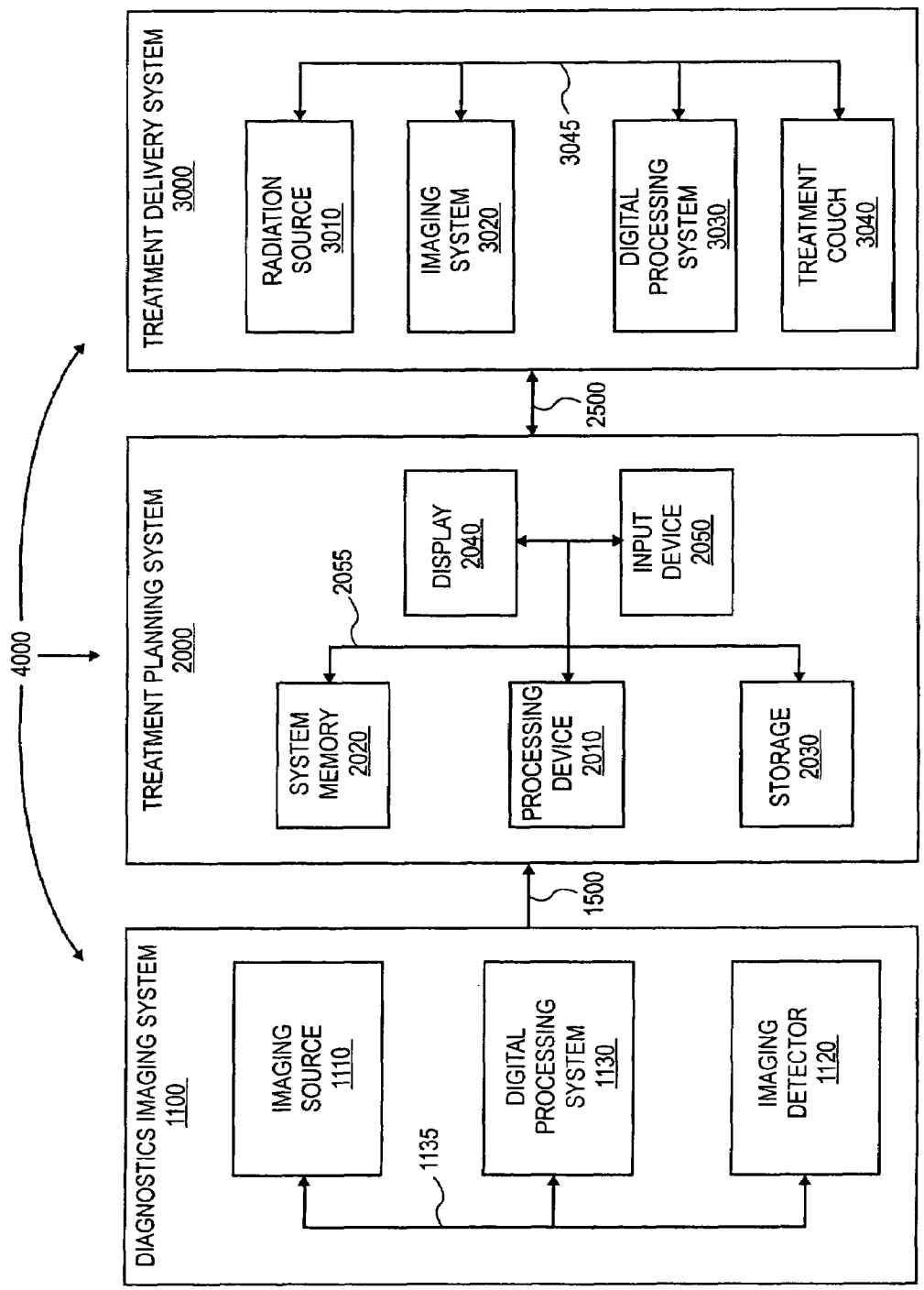
FIG. 11 is a block diagram illustrating a digital processing system for DRR generation and/or enhancement according to one embodiment.

According to certain embodiments of the invention, the above described techniques may be implemented within a medical imaging system. FIG. 11 illustrates one embodiment of systems that may be used in performing radiation treatment in which features of the present invention may be implemented. As described below and illustrated in FIG. 11, systems 4000 may include, but is not limited to, a diagnostic imaging system 1100, a treatment planning system 2000, and a treatment delivery system 3000.

Diagnostic imaging system 1100 may be any system capable of producing medical diagnostic images of a volume of interest (VOI) in a patient that may be used for subsequent medical diagnosis, treatment planning and/or treatment delivery. For example, diagnostic imaging system 1100 may be a computed tomography (CT) system, a magnetic resonance imaging (MRI) system, a positron emission tomography (PET) system, an ultrasound system or the like. For ease of discussion, diagnostic imaging system 1100 may be discussed below at times in relation to a CT x-ray imaging modality. However, other imaging modalities such as those above may also be used.

Referring to FIG. 11, according to one embodiment, diagnostic imaging system 1100 includes an imaging source 1110 to generate an imaging beam (e.g., x-rays, ultrasonic waves, radio frequency waves, etc.) and an imaging detector 1120 to detect and receive the beam generated by imaging source 1110, or a secondary beam or emission stimulated by the beam from the imaging source (e.g., in an MRI or PET scan). In one embodiment, diagnostic imaging system 1100 may include two or more diagnostic X-ray sources and two or more corresponding imaging detectors. For example, two x-ray sources may be disposed around a patient to be imaged, fixed at an angular separation from each other (e.g., 90 degrees, 45 degrees, etc.) and aimed through the patient toward (an) imaging detector(s) which may be diametrically opposed to the x-ray sources. A single large imaging detector, or multiple imaging detectors, can also be used that would be illuminated by each x-ray imaging source. Alternatively, other numbers and configurations of imaging sources and imaging detectors may be used.

The imaging source 1110 and the imaging detector 1120 are coupled to a digital processing system 1030 to control the imaging operation and process image data. Diagnostic imaging system 1100 includes a bus, an interconnect, or other means 1135 for transferring data and commands among digital processing system 1130, imaging source 1110 and imaging detector 1120. Digital processing system 1130 may include one or more general-purpose processors (e.g., a microprocessor), special purpose processor such as a digital signal processor (DSP) or other type of device such as a controller or field programmable gate array (FPGA). Digital processing system 1130 may also include other components (not shown) such as memory, storage devices, network adapters and the like. Digital processing system 1130 may be configured to generate digital diagnostic images in a standard format, such as the DICOM (Digital Imaging and Communications in Medicine) format, for example.

In other embodiments, digital processing system 1130 may generate other standard or non-standard digital image formats. Digital processing system 1130 may transmit diagnostic image files (e.g., the aforementioned DICOM formatted files) to treatment planning system 2000 over a data link 1500, which may be, for example, a direct link, a local area network (LAN) link or a wide area network (WAN) link such as the Internet. In addition, the information transferred between systems may either be pulled or pushed across the communication medium connecting the systems, such as in a remote diagnosis or treatment planning configuration. In remote diagnosis or treatment planning, a user may utilize embodiments of the present invention to diagnose or treatment plan despite the existence of a physical separation between the system user and the patient.

Treatment planning system 2000 includes a processing device 2010 to receive and process image data. Processing device 2010 may represent one or more general-purpose processors (e.g., a microprocessor), special purpose processor such as a digital signal processor (DSP) or other type of device such as a controller or field programmable gate array (FPGA). Processing device 2010 may be configured to execute instructions for performing treatment planning operations discussed herein.

In one embodiment, processing device 2010 may be configured to execute the instructions for performing the operations discussed above, such as, for example, the DRR generation process 800 of FIG. 8 and/or DRR enhancement process 1000 of FIG. 10. In one embodiment, processing device 2010 may further include or be coupled to a dedicated graphics device (not shown) to perform at least a portion of the operations set forth above. In an alternative embodiment, the above described techniques or operations may be performed by digital processing system 1120 or a combination of digital processing system 1120 and processing device 2010.

Treatment planning system 2000 may also include system memory 2020 that may include a random access memory (RAM), or other dynamic storage devices, coupled to processing device 2010 by bus 2055, for storing information and instructions to be executed by processing device 2010. System memory 2020 also may be used for storing temporary variables or other intermediate information during execution of instructions by processing device 2010. System memory 2020 may also include a read only memory (ROM) and/or other static storage device coupled to bus 2055 for storing static information and instructions for processing device 2010.

Treatment planning system 2000 may also include storage device 2030, representing one or more storage devices (e.g., a magnetic disk drive or optical disk drive) coupled to bus 2055 for storing information and instructions. Storage device 2030 may be used for storing instructions for performing the treatment planning steps discussed herein.

Processing device 2010 may also be coupled to a display device 2040, such as a cathode ray tube (CRT) or liquid crystal display (LCD), for displaying information (e.g., a 2D or 3D representation of the VOI) to the user. An input device 2050, such as a keyboard, may be coupled to processing device 2010 for communicating information and/or command selections to processing device 2010. One or more other user input devices (e.g., a mouse, a trackball or cursor direction keys) may also be used to communicate directional information, to select commands for processing device 2010 and to control cursor movements on display 2040.

It will be appreciated that treatment planning system 2000 represents only one example of a treatment planning system, which may have many different configurations and architectures, which may include more components or fewer components than treatment planning system 2000 and which may be employed with the present invention. For example, some systems often have multiple buses, such as a peripheral bus, a dedicated cache bus, etc. The treatment planning system 2000 may also include MIRIT (Medical Image Review and Import Tool) to support DICOM import (so images can be fused and targets delineated on different systems and then imported into the treatment planning system for planning and dose calculations), expanded image fusion capabilities that allow the user to treatment plan and view dose distributions on any one of various imaging modalities (e.g., MRI, CT, PET, etc.). Treatment planning systems are known in the art; accordingly, a more detailed discussion is not provided.

Treatment planning system 2000 may share its database (e.g., data stored in storage device 2030) with a treatment delivery system, such as treatment delivery system 3000, so that it may not be necessary to export from the treatment planning system prior to treatment delivery. Treatment planning system 2000 may be linked to treatment delivery system 3000 via a data link 2500, which may be a direct link, a LAN link or a WAN link as discussed above with respect to data link 1500. It should be noted that when data links 1500 and 2500 are implemented as LAN or WAN connections, any of diagnostic imaging system 1000, treatment planning system 2000 and/or treatment delivery system 3000 may be in decentralized locations such that the systems may be physically remote from each other. Alternatively, any of diagnostic imaging system 1000, treatment planning system 2000 and/or treatment delivery system 3000 may be integrated with each other in one or more systems.

Treatment delivery system 3000 includes a therapeutic and/or surgical radiation source 3010 to administer a prescribed radiation dose to a target volume in conformance with a treatment plan. Treatment delivery system 3000 may also include an imaging system 3020 to capture intra-treatment images of a patient volume (including the target volume) for registration or correlation with the diagnostic images described above in order to position the patient with respect to the radiation source. Treatment delivery system 3000 may also include a digital processing system 3030 to control radiation source 3010, imaging system 3020, and a patient support device such as a treatment couch 3040. Digital processing system 3030 may include one or more general-purpose processors (e.g., a microprocessor), special purpose processor such as a digital signal processor (DSP) or other type of device such as a controller or field programmable gate array (FPGA). Digital processing system 3030 may also include other components (not shown) such as memory, storage devices, network adapters and the like. Digital processing system 3030 may be coupled to radiation source 3010, imaging system 3020 and treatment couch 3040 by a bus 3045 or other type of control and communication interface.

Figure 12:
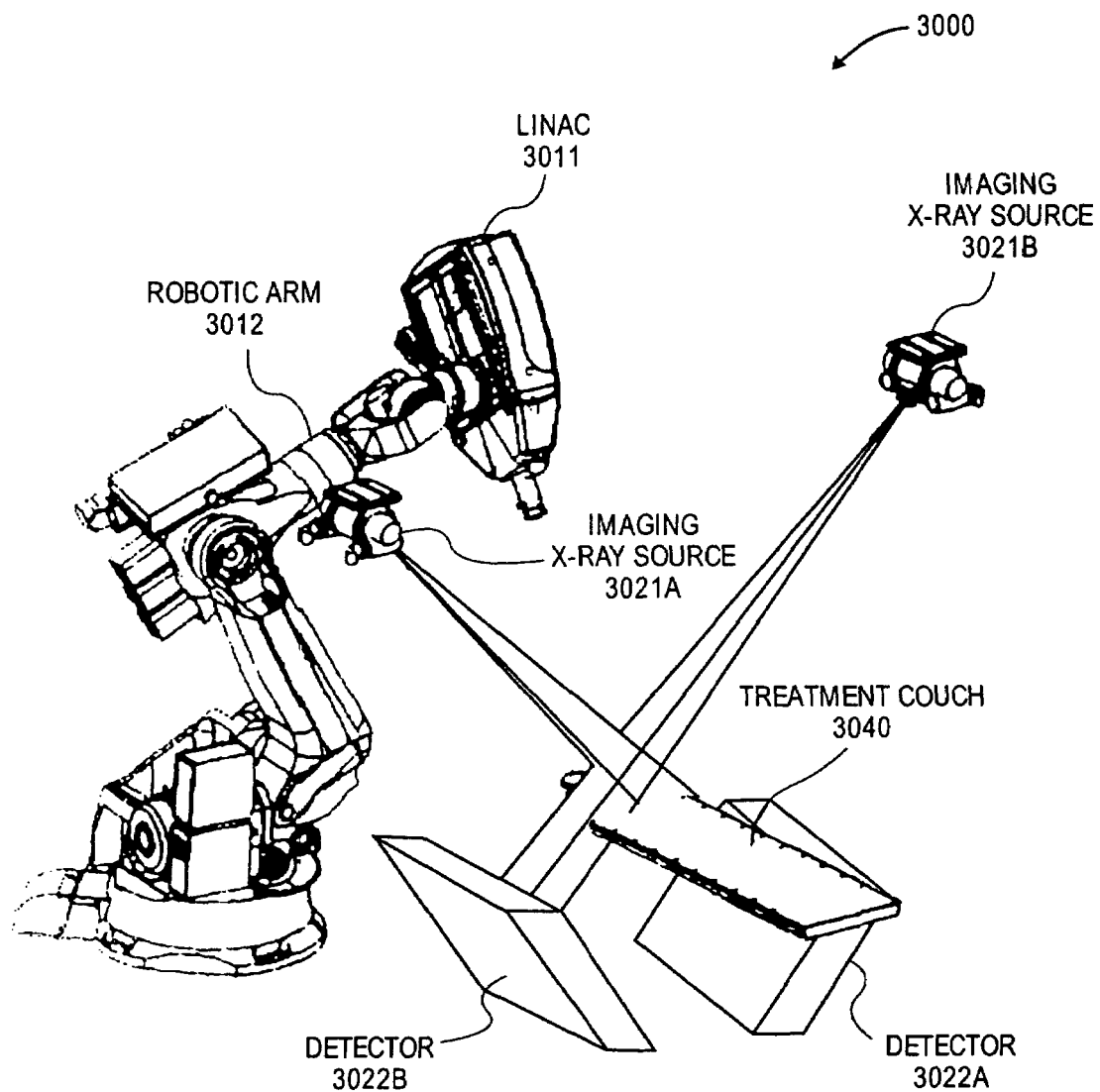
FIG. 12 is a block diagram illustrating a medical diagnostic imaging system used with one embodiment of the invention.

In one embodiment, as illustrated in FIG. 12, treatment delivery system 3000 may be an image-guided, robotic-based radiation treatment system (e.g., for performing radiosurgery) such as the CyberKnife® system developed by Accuray, Inc. of California. In FIG. 12, radiation source 3010 may be represented by a linear accelerator (LINAC) 3011 mounted on the end of a robotic arm 3012 having multiple (e.g., 5 or more) degrees of freedom in order to position the LINAC 3011 to irradiate a pathological anatomy (target region or volume) with beams delivered from many angles in an operating volume (e.g., a sphere) around the patient. Treatment may involve beam paths with a single isocenter (point of convergence), multiple isocenters, or with a non-isocentric approach (i.e., the beams need only intersect with the pathological target volume and do not necessarily converge on a single point, or isocenter, within the target). Treatment can be delivered in either a single session (mono-fraction) or in a small number of sessions (hypo-fractionation) as determined during treatment planning. With treatment delivery system 3000, in one embodiment, radiation beams may be delivered according to the treatment plan without fixing the patient to a rigid, external frame to register the intra-operative position of the target volume with the position of the target volume during the pre-operative treatment planning phase.

In FIG. 12, imaging system 3020 may be represented by X-ray sources 3021A and 3021B and X-ray image detectors (imagers) 3022A and 3022B. In one embodiment, for example, two x-ray sources 3021A and 3021B may be nominally aligned to project imaging x-ray beams through a patient from two different angular positions (e.g., separated by 90 degrees, 45 degrees, etc.) and aimed through the patient on treatment couch 3040 toward respective detectors 3022A and 3022B. In another embodiment, a single large imager can be used that would be illuminated by each x-ray imaging source. Alternatively, other numbers and configurations of imaging sources and imagers may be used.

Digital processing system 3030 may implement algorithms to register images obtained from imaging system 3020 with pre-operative treatment planning images in order to align the patient on the treatment couch 3040 within the treatment delivery system 3000, and to precisely position the radiation source with respect to the target volume.

The treatment couch 3040 may be coupled to another robotic arm (not illustrated) having multiple (e.g., 5 or more) degrees of freedom. The couch arm may have five rotational degrees of freedom and one substantially vertical, linear degree of freedom. Alternatively, the couch arm may have six rotational degrees of freedom and one substantially vertical, linear degree of freedom or at least four rotational degrees of freedom. The couch arm may be vertically mounted to a column or wall, or horizontally mounted to pedestal, floor, or ceiling. Alternatively, the treatment couch 3040 may be a component of another mechanical mechanism, such as the Axum® treatment couch developed by Accuray, Inc. of California, or be another type of conventional treatment table known to those of ordinary skill in the art.

Alternatively, treatment delivery system 3000 may be another type of treatment delivery system, for example, a gantry based (isocentric) intensity modulated radiotherapy (IMRT) system. In a gantry based system, a radiation source (e.g., a LINAC) is mounted on the gantry in such a way that it rotates in a plane corresponding to an axial slice of the patient. Radiation is then delivered from several positions on the circular plane of rotation. In IMRT, the shape of the radiation beam is defined by a multi-leaf collimator that allows portions of the beam to be blocked, so that the remaining beam incident on the patient has a pre-defined shape. The resulting system generates arbitrarily shaped radiation beams that intersect each other at the isocenter to deliver a dose distribution to the target. In IMRT planning, the optimization algorithm selects subsets of the main beam and determines the amount of time that the patient should be exposed to each subset, so that the prescribed dose constraints are best met.

In other embodiments, yet another type of treatment delivery system 3000 may be used, for example, a stereotactic frame system such as the GammaKnife®, available from Elekta of Sweden. With such a system, the optimization algorithm (also referred to as a sphere packing algorithm) of the treatment plan determines the selection and dose weighting assigned to a group of beams forming isocenters in order to best meet provided dose constraints.

It should be noted that the methods and apparatus described herein are not limited to use only with medical diagnostic imaging and treatment. In alternative embodiments, the methods and apparatus herein may be used in applications outside of the medical technology field, such as industrial imaging and non-destructive testing of materials (e.g., motor blocks in the automotive industry, airframes in the aviation industry, welds in the construction industry and drill cores in the petroleum industry) and seismic surveying. In such applications, for example, "treatment" may refer generally to the application of radiation beam(s). Other configurations may exist.

Thus, DRR generation and enhancement using a dedicated graphics device have been described. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method for generating DRR (digitally reconstructed radiography) images, the method comprising:
    loading a volume rendering program into a graphics device, the volume rendering program representing a predetermined algorithm according to a non-linear attenuation mode; and
    in response to 3D scan data, invoking the graphics device to execute the volume rendering program to perform at least a portion of volume rendering operations on at least a portion of the 3D scan data, including modifying the 3D scan data according to the predetermined algorithm to compensate for a difference between a first attenuation of an object with respect to a second attenuation associating a known intensity of the object wherein the 3D scan data comprises a plurality of CT numbers representing an image intensity of corresponding 3D CT voxels, wherein each CT voxel represents a corresponding volume element of the object, and wherein each CT number represents an attenuated intensity of an X-ray CT beam that has been generated at a CT scan energy level and that has traversed the corresponding volume element of an anatomical region, wherein each CT voxel is disposed within one of a plurality of axial voxel slices, each axial voxel slice representing a corresponding axial slice of the object, wherein integrating the CT numbers comprises:
    performing a tri-linear interpolation for the CT voxels encountered by the ray; and
    for each voxel of interest, performing a one-dimensional polynomial interpolation over the voxel of interest and for voxels on each adjacent voxel slice.

2. A computer implemented method for generating DRR (digitally reconstructed radiography) images, the method comprising:
    loading a volume rendering program into a graphics device, the volume rendering program representing a predetermined algorithm according to a non-linear attenuation model; and
    in response to 3D scan data, invoking the graphics device to execute the volume rendering program to perform at least a portion of volume rendering operations on at least a portion of the 3D scan data, including modifying the 3D scan data according to the predetermined algorithm to compensate for a difference between a first attenuation of an object with respect to a second attenuation associating a known intensity of the object, wherein the at least a portion of the volume rendering operations is performed by the graphics device substantially in parallel with receiving the 3D scan data.

3. A machine-readable medium having executable code to cause a machine to perform a method for generating DRR images, the method comprising:
    loading a volume rendering program into a graphics device, the volume rendering program representing a predetermined algorithm according to a non-linear attenuation model; and
    in response to 3D scan data, invoking the graphics device to execute the volume rendering program to perform at least a portion of volume rendering operations on at least a portion of the 3D scan data, including modifying the 3D scan data according to the predetermined algorithm to compensate for a difference between a first attenuation of an object with respect to a second attenuation associating a known intensity of the object, wherein the 3D scan data comprises a plurality of CT numbers representing an image intensity of corresponding 3D CT voxels, wherein each CT voxel represents a corresponding volume element of the object, and wherein each CT number represents an attenuated intensity of an X-ray CT beam that has been generated at a CT scan energy level and that has traversed the corresponding volume element of an anatomical region, wherein each CT voxel is disposed within one of a plurality of axial voxel slices, each axial voxel slice representing a corresponding axial slice of the object, wherein integrating the CT numbers comprises:
    performing a bi-linear interpolation for the CT voxels encountered by the ray; and
    for each voxel of interest, performing a one-dimensional polynomial interpolation over the voxel of interest and for voxels on each adjacent voxel slice.

4. A machine-readable medium having executable code to cause a machine to perform a method for generating DRR images, the method comprising:
    loading a volume rendering program into a graphics device, the volume rendering program representing a predetermined algorithm according to a non-linear attenuation model; and
    in response to 3D scan data, invoking the graphics device to execute the volume rendering program to perform at least a portion of volume rendering operations on at least a portion of the 3D scan data, including modifying the 3D scan data according to the predetermined algorithm to compensate for a difference between a first attenuation of an object with respect to a second attenuation associating a known intensity of the object, wherein the at least a portion of volume rendering operations is performed by the graphics device substantially in parallel with receiving the 3D scan data.

* * * * *